US010057399B2

(12) United States Patent
Song et al.

(10) Patent No.: US 10,057,399 B2
(45) Date of Patent: Aug. 21, 2018

(54) METHOD FOR PROVIDING INFORMATION TO HEAD UNIT OF VEHICLE BY USING TEMPLATE-BASED UI, AND HEAD UNIT AND COMPUTER-READABLE RECODING MEDIA USING THE SAME

(71) Applicant: Obigo Inc., Gyeonggi-do (KR)

(72) Inventors: Byung Soo Song, Seoul (KR); Jung Seok Lee, Gyeonggi-do (KR)

(73) Assignee: Obigo Inc., Gyeonggi-Do (KR)

( * ) Notice: Subject to any disclaimer, the term of this patent is extended or adjusted under 35 U.S.C. 154(b) by 168 days.

(21) Appl. No.: 14/277,358

(22) Filed: May 14, 2014

(65) Prior Publication Data

US 2015/0268801 A1 Sep. 24, 2015

(30) Foreign Application Priority Data

Mar. 18, 2014 (KR) ........................ 10-2014-0031621

(51) Int. Cl.

*G06F 9/44* (2018.01)
*G06F 3/048* (2013.01)
*H04M 1/725* (2006.01)
*G01C 21/36* (2006.01)
*H04M 1/60* (2006.01)

(52) U.S. Cl.

CPC .... *H04M 1/72527* (2013.01); *G01C 21/3688* (2013.01); *H04M 1/6075* (2013.01)

(58) Field of Classification Search

CPC ...................................................... B64D 43/02
USPC .............................................................. 701/1
See application file for complete search history.

(56) References Cited

U.S. PATENT DOCUMENTS

2007/0234235 A1* 10/2007 Scott .................... G06F 3/0481 715/825
2012/0110511 A1* 5/2012 Howard ........................ 715/835
2014/0277843 A1* 9/2014 Langlois ............. H04M 1/6091 701/2

FOREIGN PATENT DOCUMENTS

KR 1020130139623 12/2013

* cited by examiner

*Primary Examiner* — Charles J Han
(74) *Attorney, Agent, or Firm* — Husch Blackwell LLP

(57) ABSTRACT

A method for providing information to a head unit of a vehicle by using a template-based user interface. The head unit acquires information on multiple applications belonging to a specific category among built-in internal applications of the head unit and external applications stored in a mobile terminal connected with the head unit. The head unit acquires information on available applications that support detailed functions included in the acquired multiple applications belonging to the specific category by individual detailed functions by referring to the information on the detailed functions included in the applications belonging thereto. The head unit to displays one or more lists of the available applications by the detailed functions through the template.

10 Claims, 6 Drawing Sheets

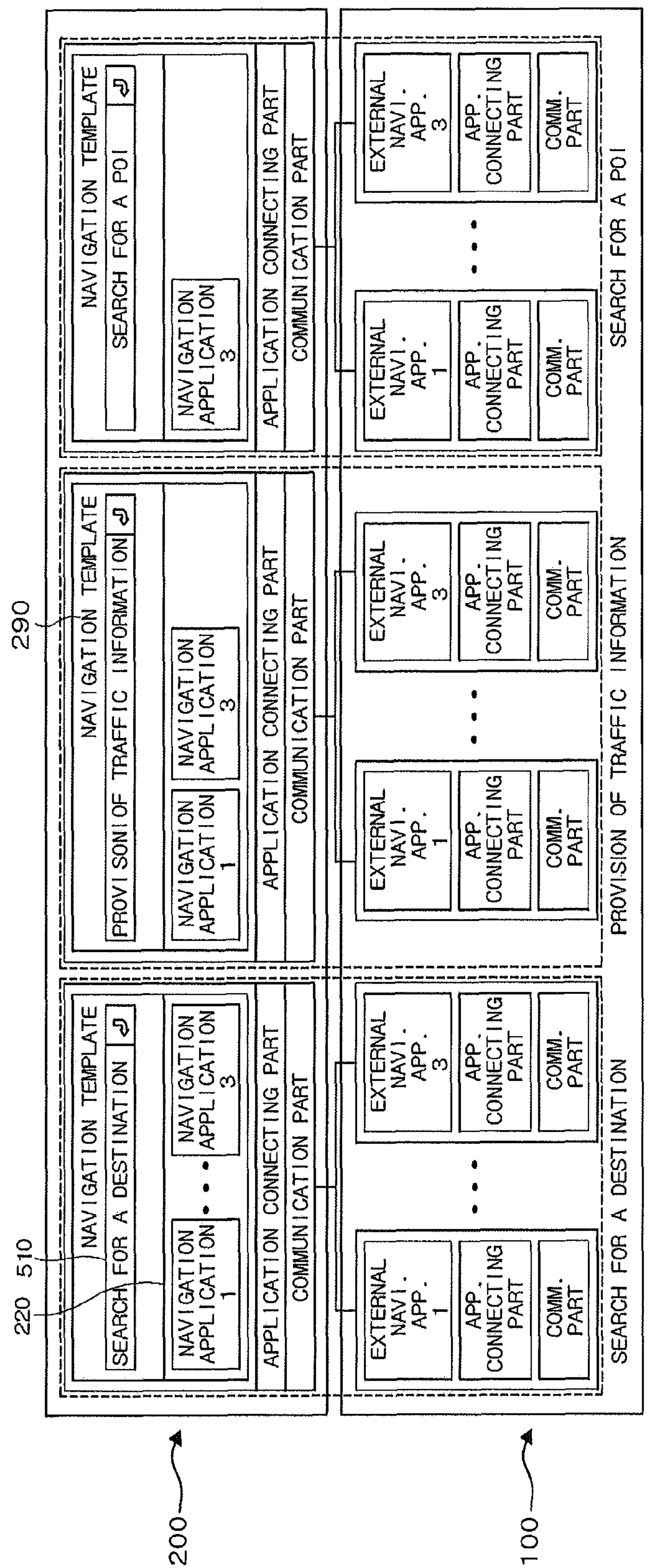
FIG. 5
200
100
220
510
290
NAVIGATION TEMPLATE
SEARCH FOR A DESTINATION
NAVIGATION APPLICATION 1
NAVIGATION APPLICATION 3
APPLICATION CONNECTING PART
COMMUNICATION PART
EXTERNAL NAVI. APP. 1
EXTERNAL NAVI. APP. 3
APP. CONNECTING PART
COMM. PART
SEARCH FOR A DESTINATION
NAVIGATION TEMPLATE
PROVISONI OF TRAFFIC INFORMATION
NAVIGATION APPLICATION 1
NAVIGATION APPLICATION 3
APPLICATION CONNECTING PART
COMMUNICATION PART
EXTERNAL NAVI. APP. 1
EXTERNAL NAVI. APP. 3
APP. CONNECTING PART
COMM. PART
PROVISION OF TRAFFIC INFORMATION
NAVIGATION TEMPLATE
SEARCH FOR A POI
NAVIGATION APPLICATION 3
APPLICATION CONNECTING PART
COMMUNICATION PART
EXTERNAL NAVI. APP. 1
EXTERNAL NAVI. APP. 3
APP. CONNECTING PART
COMM. PART
SEARCH FOR A POI

METHOD FOR PROVIDING INFORMATION TO HEAD UNIT OF VEHICLE BY USING TEMPLATE-BASED UI, AND HEAD UNIT AND COMPUTER-READABLE RECODING MEDIA USING THE SAME

CROSS REFERENCE TO RELATED APPLICATION

This application claims priority to and incorporates herein by reference all disclosure in Korean Patent Application No. 10-2014-0031621 filed Mar. 18, 2014.

FIELD OF THE INVENTION

The present invention relates to a method for providing information to a head unit of a vehicle by using a template-based UI and the head unit and a computer-readable recording media using the same; and more particularly, to the method for allowing the head unit to acquire information on multiple applications belonging to a specific category among its built-in internal applications and external applications stored in a mobile terminal connected with itself, if its template is driven to execute the applications belonging thereto, allowing the head unit to acquire information on available applications that support detailed functions among the acquired multiple applications belonging thereto by individual detailed functions by referring to the information on the detailed functions included in the applications belonging thereto, and providing the information on a list of the available applications to the head unit through the template thereof and the head unit and the computer-readable recording media using the same.

BACKGROUND OF THE INVENTION

The information provided by navigation systems of existing head units mostly had been changed just by the updates of the applications of the navigation systems through connections with USB drives, etc. but could not reflect real-time traffic information properly. To solve the problem, applications of the navigation systems that reflected real-time traffic conditions in mobile terminals such as smart phones had been used during the operation of vehicles, but they were not navigation systems in the head units built in such vehicles. Therefore, there were many inconvenient problems for vehicle users to use, including impossibility to fix such devices during the operation.

To solve the problems as mentioned above, conventional technologies such as a patent titled "Location-based Information Providing Apparatus and Method by Using Smart Phones" illustrated in FIG. 6 (Korean Laid-Open Publication No. 10-2013-0139623) had a characteristic of providing location-based information in real time by connecting a device without a telematics function with a smart phone but this had the limit to increase of user satisfaction because there is a problem that a variety of applications of a navigation system cannot be selected.

Thus, the inventor of the present invention intends to provide a head unit of a vehicle with information by using a template-based user interface (UI) that may collect driving information and specialized information of a navigation application of a connected mobile terminal and then provide the information to the head unit.

SUMMARY OF THE INVENTION

It is an object of the present invention to solve all the problems mentioned above.

It is another object of the present invention to allow a driver to acquire information more easily because lists of available applications by individual detailed functions are provided to the driver through a template.

It is still another object of the present invention to allow a user to receive optimal information fit for the user's taste by integrating advantages or characteristics of multiple applications in a template of a head unit and providing them to make the user select them.

In accordance with one aspect of the present invention, there is provided a method for providing information to a head unit of a vehicle by using a template-based user interface, including steps of: (a) allowing the head unit to acquire information on multiple applications belonging to a specific category among built-in internal applications of the head unit and external applications stored in a mobile terminal connected with the head unit, if a template of the head unit is driven to execute them belonging thereto; (b) allowing the head unit to acquire information on available applications that support detailed functions included in the acquired multiple applications belonging to the specific category by individual detailed functions by referring to the information on the detailed functions included in the applications belonging thereto; and (c) allowing the head unit to display one or more lists of the available applications by the detailed functions through the template.

In accordance with another aspect of the present invention, there is provided a head unit of a vehicle that provides information by using a template-based user interface, including: an application information acquiring part for acquiring information on multiple applications belonging to a specific category among its built-in internal applications and external applications stored in a mobile terminal connected with itself, if its template is driven to execute the applications belonging thereto; an application list managing part for acquiring information on available applications that support detailed functions included in the acquired multiple applications belonging to the specific category by individual detailed functions by referring to the information on the detailed functions included in the applications belonging thereto; and a user interface providing part for displaying one or more lists of the available applications by the detailed functions through the template.

BRIEF DESCRIPTION OF THE DRAWINGS

The above and other objects and features of the present invention will become apparent from the following description of preferred embodiments given in conjunction with the accompanying drawings, in which:

FIG. 5 shows a method for providing the information to the head unit of the vehicle by using the template-based UI in use of multiple detailed functions in multiple mobile terminals in accordance with one example embodiment of the present invention.

DETAILED DESCRIPTION OF THE PREFERRED EMBODIMENTS

Figure 1:
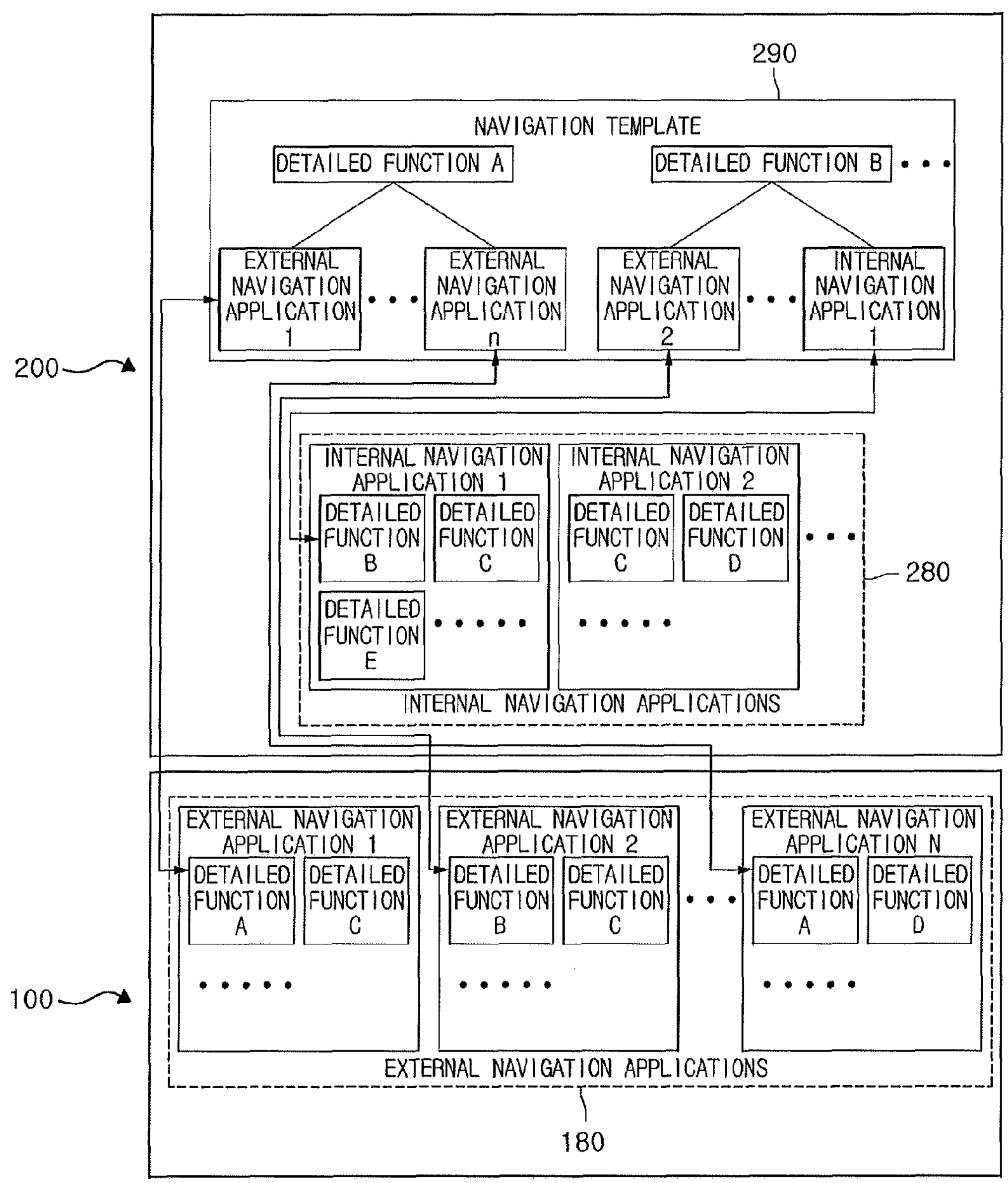
FIG. 1 is a drawing showing a method for providing information to a head unit of a vehicle by using a template-based UI in accordance with one example embodiment of the present invention.

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as follows:

FIG. 1 is a drawing showing a method for providing information to a head unit of a vehicle by using template-based UI in accordance with one example embodiment of the present invention.

In accordance with the present invention, information on multiple applications acquired from a mobile terminal(s) may be provided to the head unit of the vehicle by being applied to a template whose components are changed with the information on the multiple applications.

First of all, by referring to FIG. 1, a method for providing the information to the head unit of the vehicle by using the template-based UI will be explained first as shown below. For reference, a navigation application as an example will be described for convenience of explanation.

As illustrated in FIG. 1, a whole system in accordance with one example embodiment of the present invention may be configured with a head unit 200 with at least one internal navigation application 280 and one or more mobile terminals 100 with at least one external navigation application 180.

Figure 3:
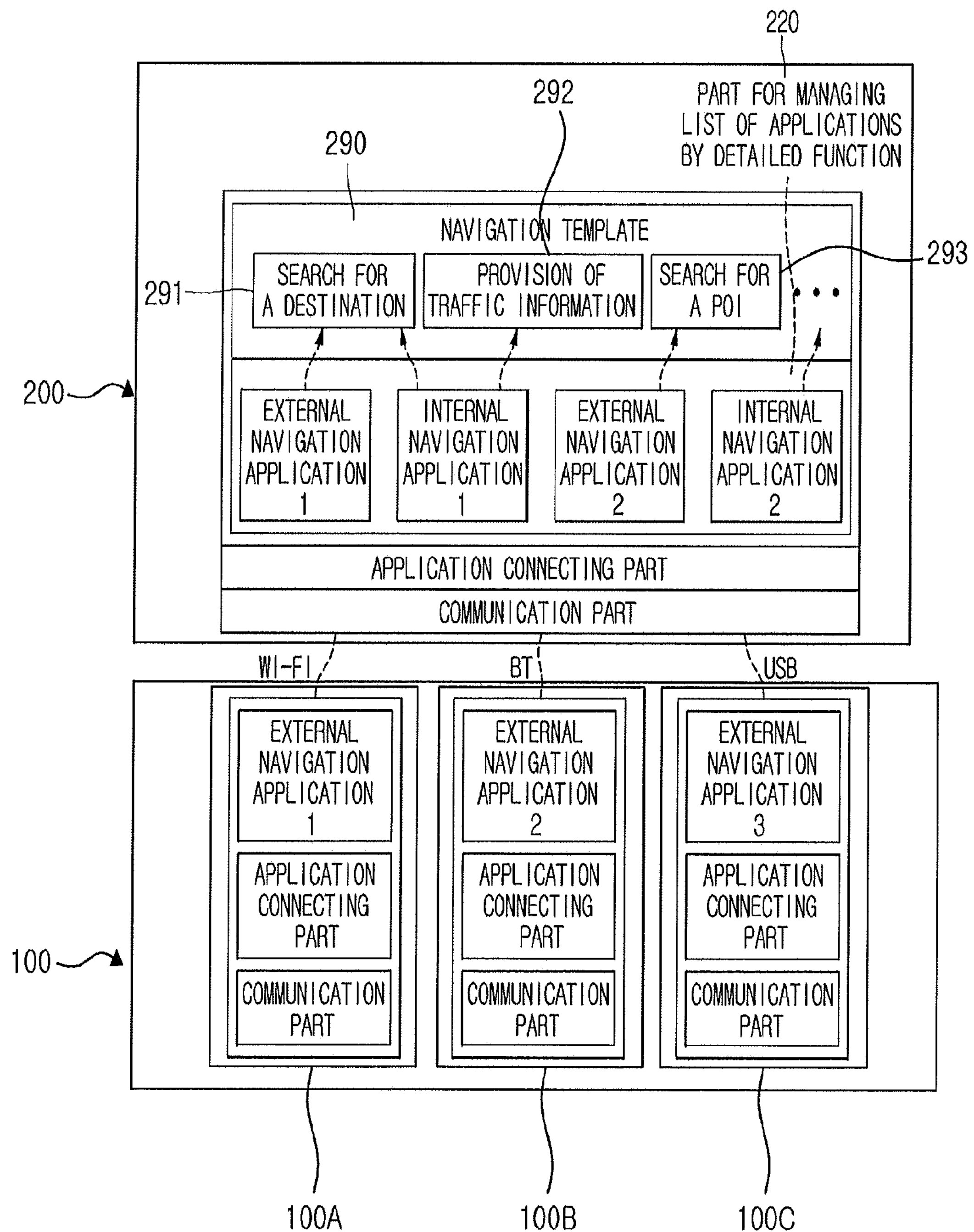
FIG. 3 shows a method for providing information to the head unit of the vehicle by using the template-based UI in use of multiple mobile terminals in accordance with an example embodiment of the present invention.
Figure 4:
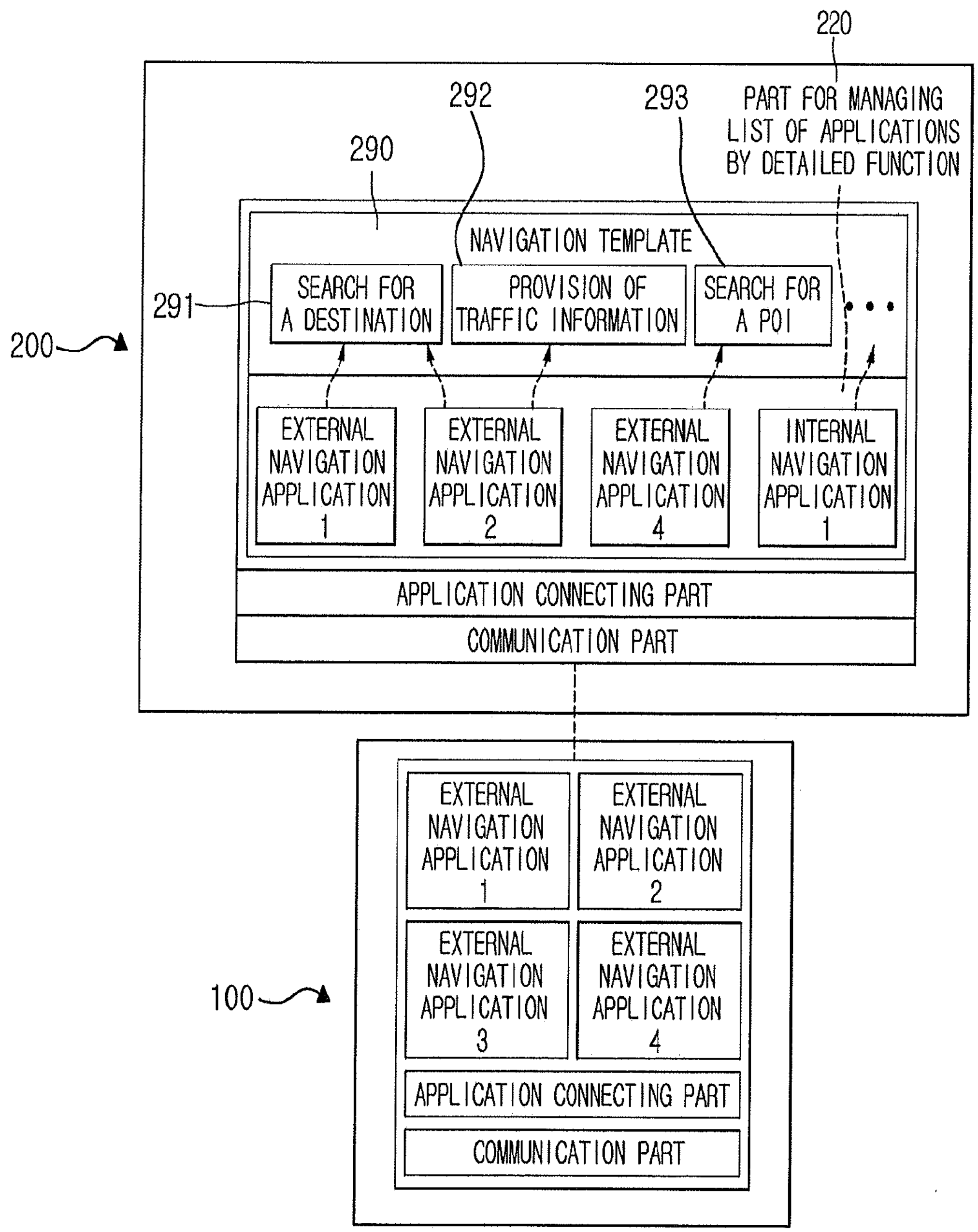
FIG. 4 represents a method for providing the information to the head unit of the vehicle by using the template-based UI in use of multiple applications in one mobile terminal in accordance with one example embodiment of the present invention.
Figure 6:
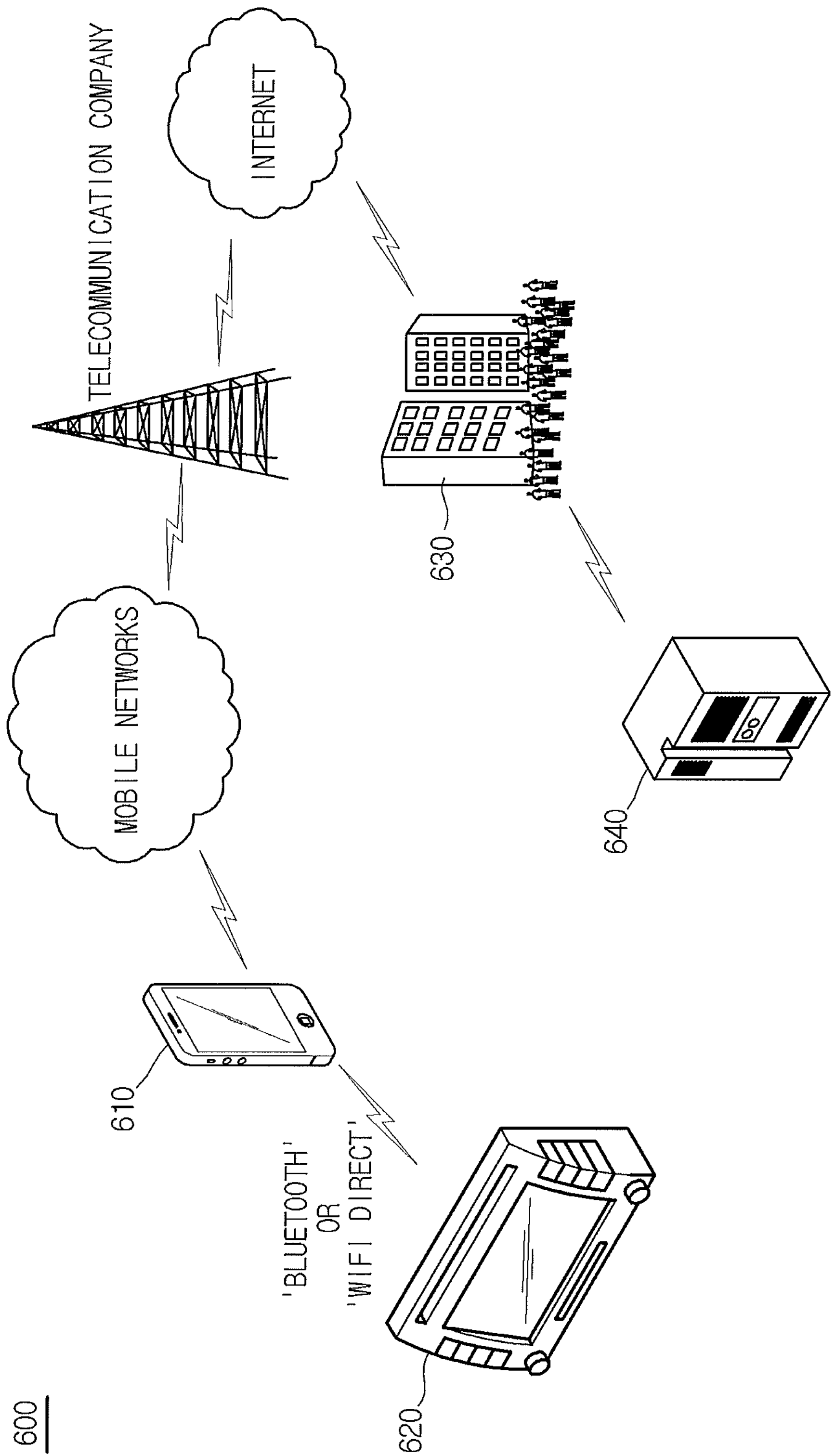
FIG. 6 depicts a method for providing information to a navigation system according to a conventional technology.

First, an application connecting part of the head unit 200 (as illustrated in FIGS. 3 through 5) in accordance with one example embodiment of the present invention may connect the head unit 200 with the one or more mobile terminals 100 in interoperation with respective application connecting parts of the mobile terminals 100. Thus, a template 290 provided by the head unit 200 can be connected with an application(s) executable in the mobile terminal 100. Accordingly, a user may be provided with information inputted to an application executed in the mobile terminal 100 through the template 290 of the head unit 200, and a function of transmitting control information inputted through the template of the head unit 200 by the user to the application executed in the mobile terminal 100 may be performed and the user may be allowed to use the application through the template 290 of the head unit 200.

In an environment where the mobile terminal such as a smart phone or a tablet is connected with the head unit 200, the head unit 200 acquires information on the application stored at an executable state in the mobile terminal 100. At the time, the application may be an application which uses GPS information such as a navigation system, an application such as a MP3 player with a list by using music information and other various kinds of applications, but for the convenience of explanation, mainly an example of navigation system-related application will be explained in the present invention.

If a template 290 of the head unit 200 is driven to execute an application belonging to a navigation category, the head unit 200 acquires information on multiple applications belonging to the navigation category among internal applications 280 built in the head unit 200 and external applications 180 stored in the mobile terminal 100 connected with the head unit 200. The multiple applications could be introduced as being acquired from the internal applications 280 and the external applications 180, but they are not limited to these and they could be acquired only from the internal applications 280 or only from the external applications 180. For reference, if the multiple navigation applications belonging to the navigation category are acquired from the mobile terminal(s) 100, information on multiple navigation applications belonging thereto from individual mobile terminals 100 or information on multiple navigation applications belonging thereto from one mobile terminal 100 could be acquired.

By referring to information on detailed functions included in the applications belonging to the navigation category, the head unit 200 may acquire information on a navigation application that supports a corresponding detailed function (so-called an available application) among the acquired multiple navigation applications. For example, the detailed function could be a concept of including at least some of functions of search for a destination, provision of traffic information, and search for a POI, as mainly used functions in the navigation applications, and could include other functions of the navigation system. For example, as information on a navigation application that supports detailed function A by referring to FIG. 1, external navigation application 1, external navigation application n, etc. could be acquired.

Besides, the head unit 200 may display lists of the available navigation applications by the detailed functions through the template and may display a status of executing a certain available navigation application which is selected by a user from all the available navigation applications displayed for a specified function among all the detailed functions through the template.

If the specified function is selected among all the detailed functions, and there is a particular navigation application set as default among all the navigation applications corresponding to the specified function, the corresponding detailed function of the particular navigation application could be also executed.

Figure 2:
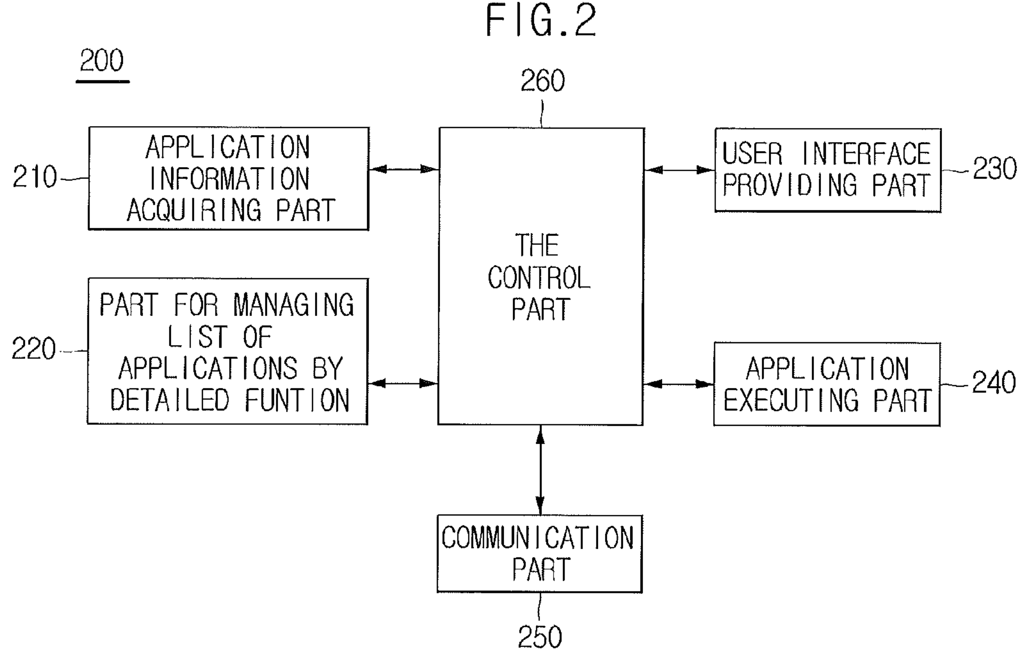
FIG. 2 is a block diagram representing a configuration of the head unit of the vehicle in accordance with one example embodiment of the present invention.

FIG. 2 is a block diagram representing a configuration of the head unit of the vehicle in accordance with one example embodiment of the present invention.

By referring to FIG. 2, the head unit 200 in accordance with one example embodiment of the present invention could include an application information acquiring part 210, a part 220 for managing list of applications by detailed function, a user interface providing part 230, an application executing part 240, a communication part 250, a control part 260, etc.

In accordance with one example embodiment, at least some of the application information acquiring part 210, the part 220 for managing list of applications by detailed function, the user interface providing part 230, the application executing part 240, the communication part 250, and the control part 260 may be included in the head unit 100 in a form of program module communicating with the mobile terminal. Besides, such program modules may be included in the head unit 200 in a form of an operating system, an application program module and other program module, and they may be also stored on known several memory devices physically. For reference, "the part 220 for managing list of applications by detailed function" is renamed as "the application list managing part" for simplicity. Moreover, the program modules may be stored on remote memory devices communicable to the head unit 200. The program modules may include but not be subject to a routine, a subroutine, a program, an object, a component, and a data structure for executing a specific operation or a type of specific abstract data that will be described in accordance with the present invention, but they are not limited to these.

First of all, the application information acquiring part 210 in accordance with one example embodiment of the present invention may acquire information on the multiple applications belonging to the specific category, e.g., the navigation category, among all the internal applications 280 built in the head unit 200 and all the external applications 180 stored in a mobile terminal connected with the head unit 200, if the template 290 of the head unit 200 is driven to execute the applications belonging to the navigation category.

Besides, by referring to FIG. 3, the application connecting parts of the head unit 200 and the mobile terminals 100 may perform a function of allowing event(s) or content information occurring in the applications of the mobile terminals 100, i.e., external applications, to be transmitted to the template 290 of the head unit 200 and allowing event(s) or control information occurring at the template 290 of the head unit 200 to be transmitted to the applications of the mobile terminals 100, i.e., external applications. To do this, the template 290 of the head unit 200 and the applications of the mobile terminals 100 may share a software library necessary to interoperate with each other.

Additionally, the application connecting part of the head unit 200 in accordance with the present invention may also allow event(s) or content information occurring in the internal applications built in the head unit 200 to be transmitted to the template 290 of the head unit 200 and allow event(s) or control information occurring at the template 290 of the head unit 200 to be transmitted to the internal applications.

By referring to information on detailed functions included in applications belonging to the specific category acquired by the application information acquiring part 210, the part 220 for managing list of applications by detailed function may acquire information on an available application(s) that supports the detailed functions among all the acquired multiple applications by the individual detailed functions, where a navigation category, a music category, a video category, etc. could be introduced as the specific category referred to by the part 220 for managing list of applications by detailed function. On assumption that the specific category is a navigation category, the detailed functions could include functions of search for a destination, provision of traffic information, search for a POI, etc.

Besides, if the user interface providing part 230 displays the lists of available applications by the individual detailed functions through the template 290, and the specified function is selected by the user among all the detailed functions, the application executing part 240 could execute a particular available application corresponding to the selected detailed function. Of course, the application executing part 240 could also allow a certain available application, set as default, among all the available applications corresponding to the specified function to be executed.

As illustrated in FIG. 2, the communication part 250 performs a function of allowing the head unit 200 to communicate with an external system such as a mobile terminal.

Besides, the control part 260, as illustrated in FIG. 2, performs a function of controlling data flow among the application information acquiring part 210, the part 220 for managing list of applications by detailed function, the user interface providing part 230, the application executing part 240, and the communication part 250. In other words, the control part 260 controls the flow of data from/to outside or between the component of the head unit 200, the application information acquiring part 210, the part 220 for managing list of applications by detailed function, the user interface providing part 230, the application executing part 240, and the communication part 250 to allow each part to perform its unique functions.

By referring to FIG. 3 again, it shows a method for providing information to the head unit 200 of a vehicle based on a template-based UI by using multiple mobile terminals 100 in accordance with one example embodiment of the present invention, from which it can be found that information on the available navigation applications by detailed function, e.g., by individual functions of search for a destination, provision of traffic information, and search for a POI, is acquired by the part 220.

More specifically, for example, on assumption that "search for a destination" is in detailed functions included not only in navigation application 1 of the mobile terminal 100A (i.e., external navigation application 1) connected through Wi-Fi communication but also in internal navigation application 1 built in the head unit 200, when the navigation template 290 is driven, information on the internal navigation application 1 of the head unit 200 and the external navigation application 1 of the mobile terminal 100A is managed as a list of available applications for the detailed function of "search for a destination 291". At the time, the user interface providing part 230 could display a list of the external navigation application 1 and the internal navigation application 1 that support the function of "search for a destination 291" through the navigation template 290.

In accordance with one example embodiment of the present invention, FIG. 4 illustrates a method for providing information to the head unit 200 of the vehicle with the template-based UI by using multiple applications in one mobile terminal 100, and introduces a case of one mobile terminal 100 including four navigation applications in the same category (where it is assumed to be a navigation category). In such case, optimal information for the navigation system may be provided by combining multiple navigation applications through the navigation template 290.

More specifically, on assumption that the external navigation application 1 provides a detailed function called “search for a destination 291”, and the external navigation application 2 provides “search for a destination 291” and “provision of traffic information 292” as detailed functions, information on the external navigation application 1 and the external navigation application 2 would be acquired as available navigation applications for detailed function of “search for a destination 291” by the part 220 for managing list of applications by detailed function and information on the external navigation application 2 would be acquired as an available navigation application for the detailed function of “provision of traffic information 292”. Of course, the lists of the available navigation applications could be displayed by the user interface providing part 230 through the navigation template 290. Besides, even information on certain functions that may be supported by the internal applications of the head unit 200 could also be acquired and the internal applications could also be displayed as a list(s) including the available applications capable of supporting the certain functions through the template of the navigation system, but for the convenience of the explanation, it was not illustrated in detail herein.

FIG. 5 shows a method for providing the information to the head unit of the vehicle with the template-based UI by using multiple detailed functions in multiple mobile terminals 100 in accordance with one example embodiment of the present invention. By referring to detailed functions supported by multiple navigation applications, lists of applications may be displayed by detailed functions through the navigation template 290.

For example, a search window 510 where “search for a destination”, one of detailed functions of the navigation application, can be searched through the navigation template 290 may be provided. Surely, information on external navigation applications 1, 2, and 3, which support the function of search for a destination, could be displayed by the user interface providing part 230 as information acquired by the part 220 for managing list of applications by detailed function. If the user selects the external navigation application 2, the application executing part 240 could allow the external navigation application 2 to be executed. For another example, if the internal navigation application 1 is set as a default, the internal navigation application 1 could also be allowed to be executed by the application executing part 240.

In addition, some of available navigation applications that support detailed functions such as “provision of traffic information”, “search for a POI”, etc. may be executed by being selected and a certain navigation application(s) suitable for each detailed function included in the navigation applications may be selected according to the user’s intention or the situation of a road where the user drives and this has an effect of providing an optimized service fit for the user by providing optimal information to the head unit of the vehicle.

For example, if a driver wants “search for a destination”, and selects a particular navigation application among three available navigation applications corresponding to the function of “search for a destination”, the application connecting part of the head unit 200 may put a query to the particular navigation application in interoperation with the application connecting part of the mobile terminal which stores the particular navigation application through the communication part 250 and receive the result therefrom. The received result could be displayed through the template 290 of the head unit 200. Such process could be applied even to cases where each navigation applications exists in each of multiple mobile terminals or where multiple navigation applications exist in one mobile terminal and each of them has each detailed function.

This invention has an effect of a driver acquiring necessary information more easily because lists of available applications by individual detailed functions are displayed through the template.

In addition, the information on available applications that support detailed functions is provided by identifying multiple applications belonging to the specific category among internal applications built in the head unit and external applications stored in the mobile terminal connected with the head unit and referring to information on the detailed functions included in the applications belonging to the specific category to support the user to select his or her desired information very easily.

The embodiments of the present invention as explained above can be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments and drawings. While the invention has been shown and described with respect to the preferred embodiments, it, however, will be understood by those skilled in the art that various changes and modification may be made.

Accordingly, the thought of the present invention must not be confined to the explained embodiments, and the following patent claims as well as everything including variations equal or equivalent to the patent claims pertain to the category of the thought of the present invention.

What is claimed is:

1. A method for providing information to a head unit of a vehicle by using a template-based user interface, comprising steps of:

(a) the head unit acquiring a set of at least two categories and a list of applications belonging to at least one of the plurality of categories from a memory associated with the head unit and from at least one mobile terminal in communication with the head unit, wherein each application belongs to at least one category of the set of categories, wherein the category of each of the applications represents a general type of said applications within each said category;

(b) the head unit acquiring a list of functions capable of being performed by the applications belonging to a plurality of categories of said set of categories, from the head unit and the mobile terminal, wherein each of the functions is a type of action associated with a respective subset of applications selected from the applications belonging to at least one respective category;

(c) the head unit organizing the applications belonging to the plurality of categories of said set of categories by function based on which of the applications belonging to the plurality of categories of said set of categories performs which of the functions, and displaying by function, through a template displayed on a display screen of the vehicle, each subset of the applications belonging to a selected category, wherein the template provides a user interface which receives input from the user wherein the input comprises a search command activating a query function of an application belonging to the selected category; and (d) the head unit, if an application is selected by a user among one or more applications capable of performing a function included in the list of functions through the head unit, causing the user-selected application to perform the function through the head unit.

2. The method of claim 1, wherein at step (a), the head unit acquires the list of applications from multiple mobile terminals.

3. The method of claim 1, wherein the category is a navigation category.

4. The method of claim 3, wherein the list of functions includes at least one of a search for a destination, provision of traffic information, and a search for a POI.

5. The method of claim 1, wherein at the step of (c), the head unit sets one application, of all applications corresponding to a function which is selected by the user among all the functions, as a default to be executed for each of the functions.

6. A head unit of a vehicle that provides information by using a template-based user interface, comprising:

an application information acquiring part for acquiring a set of at least two categories and a list of applications belonging to at least one of the plurality of categories from a memory associated with the head unit and from at least one mobile terminal in communication with the head unit, wherein each application belongs to at least one category of the set of categories, wherein the category of each of the applications represents a general type of the applications within each said category;

an application list managing part for acquiring a list of functions capable of being performed by the applications belonging to a plurality of categories of said set of categories, from the head unit and the mobile terminal, wherein each of the functions is a type of action associated with a respective subset of applications selected from the applications belonging to at least one respective category;

said application list managing part for organizing the applications belonging to the plurality of categories of said set of categories by function based on which of the applications belonging to the plurality of categories of said set of categories performs which of the functions;

a user interface providing part for displaying by function, through a template displayed on a display screen of the vehicle, each subset of the applications belonging to a selected category, wherein the template provides a user interface which receives input from the user wherein the input comprises a search command activating a query function of an application belonging to the selected category; and an application executing part that, upon a selection by a user of an application among one or more applications capable of performing a function included in the list of functions through the head unit, causes the user-selected application to perform the function through the head unit.

7. The head unit of claim 6, wherein the application information acquiring part acquires the list of applications from multiple mobile terminals.

8. The head unit of claim 6, wherein the category referred to by the application list managing part is a navigation category.

9. The head unit of claim 8, wherein the list of functions includes at least one of a functions of search for a destination, provision of traffic information, and a search for a POI.

10. One or more non-transitory computer-readable recording media having stored thereon a computer program that, when executed by one or more processors, causes the one or more processors to perform acts including:

(a) acquiring, by the head unit a set of at least two categories and a list of applications belonging to at least one of the plurality of categories from a memory associated with the head unit and from at least one mobile terminal in communication with the head unit, wherein each application belongs to at least one category of the set of categories, wherein the category of each of the applications represents a general type of said applications within each said category;

(b) acquiring, by the head unit, a list of functions capable of being performed by the applications belonging to a plurality of categories of said set of categories, from the head unit and the mobile terminal, wherein each of the functions is a type of action associated with a respective subset of applications selected from the applications belonging to at least one respective category;

(c) organizing, by the head unit, the applications belonging to the plurality of categories of said set of categories by function based on which of the applications belonging to the plurality of categories of said set of categories performs which of the functions;

(d) displaying by function, by the head unit through a template displayed on a display screen of the vehicle, each subset of the applications belonging to a selected category, wherein the template provides a user interface which receives input from the user wherein the input comprises a search command activating a query function of an application belonging to the selected category; and (e) upon a selection by a user of an application among one or more applications capable of performing a function included in the list of functions through the head unit, causing the user-selected application to perform the function through the head unit.

* * * * *